(12) United States Patent
Bernstein et al.

(10) Patent No.: US 11,082,502 B2
(45) Date of Patent: Aug. 3, 2021

(54) POLICY ARCHITECTURE FOR CABLE NETWORKS

(71) Applicant: CISCO TECHNOLOGY, INC., San Jose, CA (US)

(72) Inventors: Alon Shlomo Bernstein, Monte Sereno, CA (US); Ian McDowell Campbell, Bow Mar, CO (US); John T. Chapman, Coto de Caza, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 219 days.

(21) Appl. No.: 15/666,644

(22) Filed: Aug. 2, 2017

(65) Prior Publication Data

US 2018/0219958 A1 Aug. 2, 2018

Related U.S. Application Data

(60) Provisional application No. 62/452,252, filed on Jan. 30, 2017.

(51) Int. Cl.
*H04L 29/08* (2006.01)
*H04L 12/24* (2006.01)

(52) U.S. Cl.
CPC .......... *H04L 67/16* (2013.01); *H04L 41/0813* (2013.01); *H04L 41/0893* (2013.01)

(58) Field of Classification Search
CPC ............. H04L 41/0806; H04L 41/0813; H04L 41/0816; H04L 41/082; H04L 41/0893; H04L 41/5022; H04L 47/70; H04L 47/781; H04L 67/02; H04L 67/16; H04L 67/322; H04L 47/10; H04L 45/02; H04W 4/60; H04W 28/16
See application file for complete search history.

(56) References Cited

U.S. PATENT DOCUMENTS

| | | | |
|---|---|---|---|
| 2005/0091505 A1* | 4/2005 | Riley | H04L 47/781 713/182 |
| 2006/0149845 A1* | 7/2006 | Malin | H04L 67/322 709/228 |
| 2007/0030860 A1* | 2/2007 | Bekele | H04L 12/2801 370/468 |
| 2007/0061433 A1* | 3/2007 | Reynolds | H04L 41/0806 709/223 |
| 2012/0201241 A1* | 8/2012 | Subramanian | H04L 45/02 370/389 |
| 2016/0094395 A1* | 3/2016 | Hu | H04W 28/16 370/254 |

* cited by examiner

*Primary Examiner* — Nicholas R Taylor
*Assistant Examiner* — Michael Li
(74) *Attorney, Agent, or Firm* — Merchant & Gould P.C.

(57) ABSTRACT

One embodiment is a method including extending a policy server to provide per subscriber policies to a cable modem (CM) and a cable modem termination system (CMTS), receiving, at the policy server, a request for a policy profile from a cable modem termination system (CMTS), accessing a subscriber database to determine the policy profile, and communicating the policy profile to the CMTS. In an example, the policy server is a packet cable multimedia policy server of a cable network.

19 Claims, 9 Drawing Sheets

POLICY ARCHITECTURE FOR CABLE NETWORKS

CROSS-REFERENCE TO RELATED APPLICATION

This application claims the benefit of priority under 35 U.S.C. § 119(e) to U.S. Provisional Application Ser. No. 62/452,252, "ENHANCED POLICY ARCHITECTURE FOR CABLE NETWORKS" filed Jan. 30, 2017, which is hereby incorporated by reference in its entirety.

TECHNICAL FIELD

This disclosure relates in general to the field of communications networks and, more particularly, to a policy architecture for cable networks.

BACKGROUND

In a system that faces subscribers (e.g., a cable network or wireless network), devices close to the subscriber side typically communicate data with a relatively large amount of information about the subscribers. However, deeper into the communications network, subscriber awareness in the data fades and device awareness increases. For example, a switch in the center of the network will be aware of media flows/devices, but will not be able to readily connect those flows back to a particular subscriber.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Example Embodiments

The following detailed description sets forth example embodiments of apparatuses, methods, and systems relating to a policy architecture for cable networks. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof where like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1A:
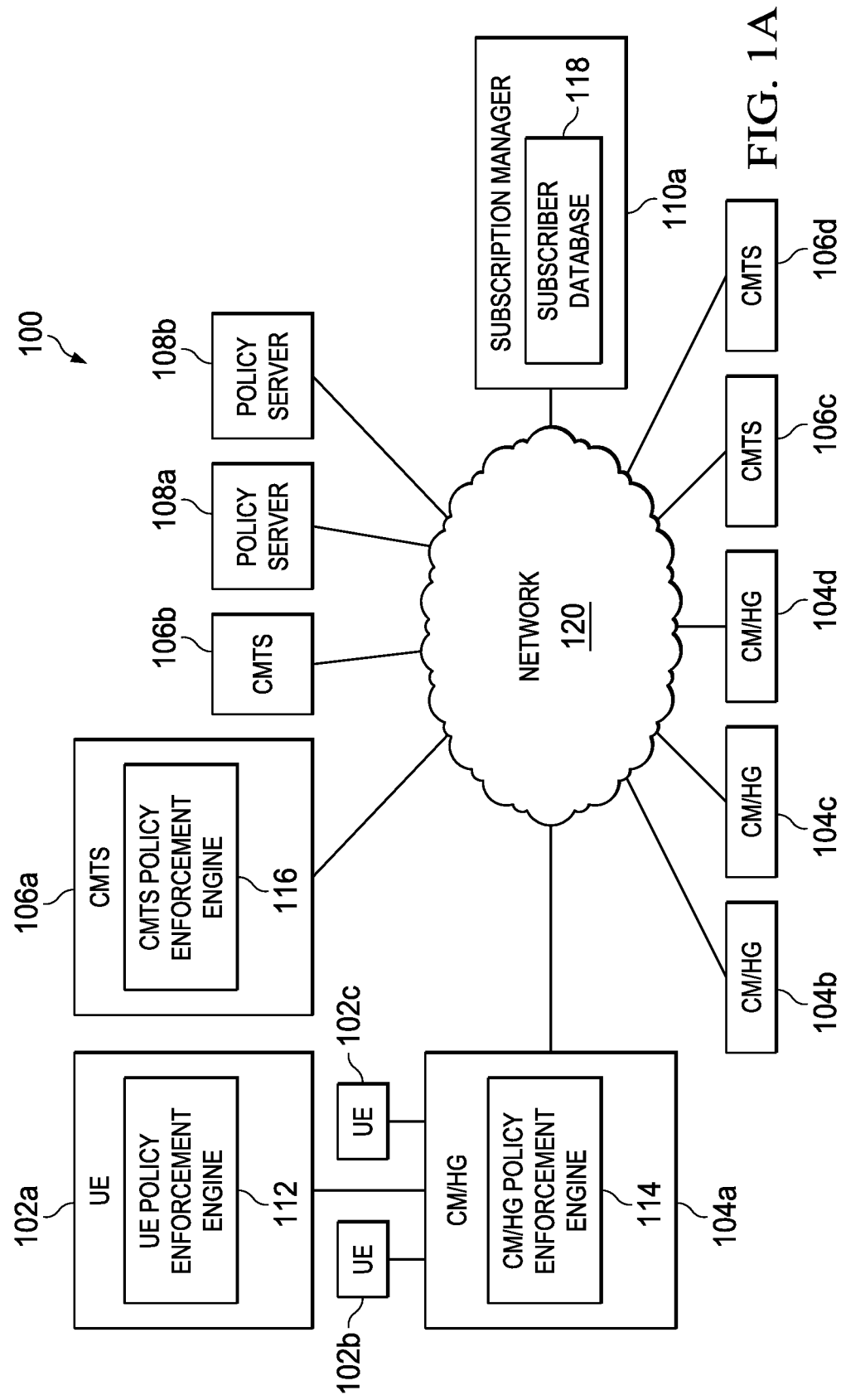
FIG. 1A is a simplified block diagram of a communication system to enable enhanced policy architecture for cable networks in accordance with one embodiment of the present disclosure.

FIG. 1A is a simplified block diagram of a communication system 100 to enable enhanced policy architecture for cable networks. Communication system 100 can include one or more user equipment (UE) 102a-102c, one or more cable modems/home gateways (CM/HG) 104a-104d, one or more cable modem termination systems (CMTS) 106a-106d, one or more policy servers 108a and 108b, and one or more subscription managers 110a. Each UE 102a-102c can include a UE policy enforcement engine 112. Each CM/HG 104a-104d can include a CM/HG policy enforcement engine 114. Each CMTS 106a-106d can include a CMTS policy enforcement engine 116. Each subscription manager 110 can include a subscriber database 118. Each CM/HG 104a-104d, CMTS 106a-106d, policy server 108a and 108b, and subscription manager 110 can be in communication using network 120.

Figure 1B:
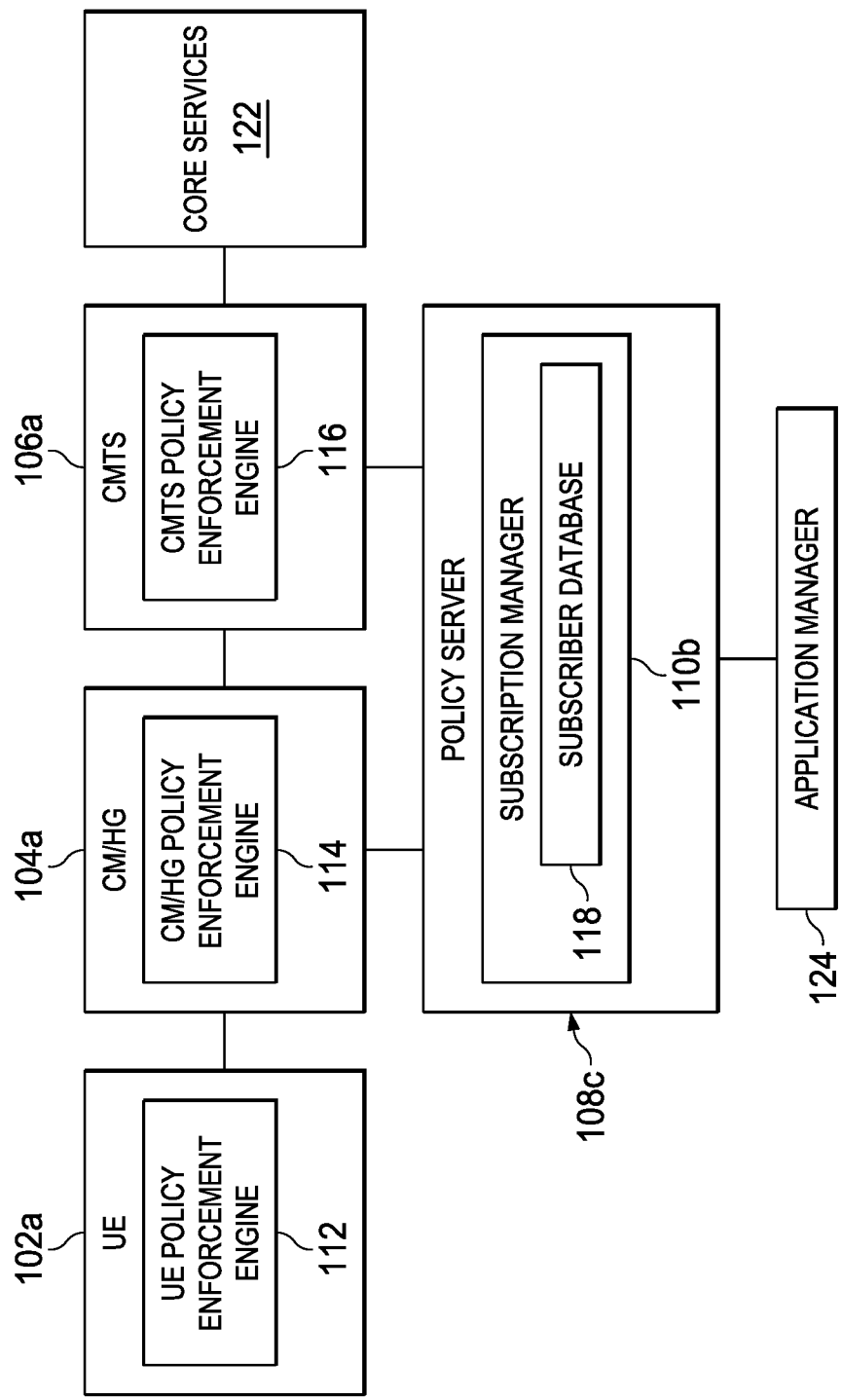
FIG. 1B is a simplified block diagram of a portion of a communication system to enable enhanced policy architecture for cable networks in accordance with one embodiment of the present disclosure.

Turning to FIG. 1B, FIG. 1B is a simplified block diagram of a portion of communication system 100. In an example, UE 102a can communicate with CM/HG 104a. CM/HG 104a can communicate with CMTS 106a and with policy server 108c. CMTS 106a can be in communication with core services 122. Policy server 108c can be in communication with application manager 124. In an example, instead of subscription manager 110a (shown in FIG. 1A) being outside or separate from a policy server, policy server 108c can include subscription manager 110a.

Each UE 102a-102c can include a desktop computer, laptop computer, mobile device, personal digital assistant, smartphone, tablet, wearable, Internet of Things (IoT) device, or or any other device used directly by a subscriber (e.g., an end-user) to communicate data to communication system 100. Each CM/HG 104a-104d can be a cable modem or home gateway that allows UEs to communicate data to and receive data from commutation system 100. Each CMTS 106a-106d can at a headend or hub site and is configured to exchange data with CMs in communication system 100. Policy server 108a-108c can be a packet cable multimedia policy server of a cable network. Subscription manager 110a can be configured to determine the subscriber identity and link to higher levels of information about the subscriber (e.g., name, address, payment status etc.). Any subscriber that wishes to join the network needs to be authenticated with subscription manager 110a. Core services 122 can be configured to provide various control and traffic services and can act as a policy enforcement point where the rules defined by the policy are enforced on the actual packet streams. Application manager 124 can help control the installation, patching, updating, access, and management of applications on communication system 100.

In an example, each policy server 108a-108c can be configured to provide per-subscriber policies to each UE 102a-102c, CM/HG 104a-104d, and CMTS 106a-106d. The policies can be enforced at each UE 102a-102c by a local UE policy enforcement engine 112. The policies can be enforced at each CM/HG 104a-104d by a local CM/HG policy enforcement engine 114. The policies can be enforced at each CMTS 106a-106d by a local CMTS policy enforcement engine 116. Subscriber database 118 can be used by subscription manager 110a and 110b to enable subscriber authorization and the implementation of policy profiles.

For purposes of illustrating certain example techniques of communication system 100, it is important to understand how typical communications may traverse the network. The following foundational information may be viewed as a basis from which the present disclosure may be properly explained.

Networking architectures continue to grow increasingly complex in communication environments. As the number of end users increases and/or becomes mobile, efficient management and proper routing of data flows becomes critical. One issue with having the relatively large amount of traffic is assigning and implementing subscriber specific policies to the data flow at the CM/HG and the CMTS.

A communication system, as outlined in FIG. 1, can resolve these issues (and others). Communication system 100 can be configured to provide a system to allow for assigning and implementing subscriber specific policies to the data flow at the CM/HG and the CMTS. In an example, CM/HG policy enforcement engine 114 can be configured to enforce policies behind the cable modem. In a specific example, a CM (e.g., CM/HG 104a) and a CMTS (e.g., CMTS 106a) can share a service flow. A service flow identifier identifying a subscriber can be assigned to the service flow by the CMTS.

When a CM is attached to the CMTS, the CMTS will provision one of more service flows based upon the configuration information in a CM configuration file. A policy server (e.g., policy server 108a) can discover the service flow identifier from the CMTS that connects to the CM. In an example, the service flow can act as the bearer path. The policy server can use the service flow identifier to identify one or more policies for the subscriber from subscriber database 118 and apply the one or more policies to the CMTS and CM for each service. At the CM, the one or more policies can be enforced by CM/HG policy enforcement engine 114. At the CMTS, the one or more policies can be enforced by CMTS policy enforcement engine 116.

In some current systems, a CM policy is communicated within data over cable service interface specification (DOCSIS) from the CMTS as a DOCSIS message. Communication system 100 can be configured to allow policy server 108a to have the ability to read/modify/write/replace current policies from the CMTS. When a CM reboots, the policy must be reapplied. If applicable, some policies can be enforced on the user equipment (e.g., UE 102a) by UE policy enforcement engine 112. The policies on the UE can be applicable to software download onto the UE, may be part of a generic policy on a UE that can connect to any network, etc. If a small cell is behind the CM. UE policy enforcement engine 112 can be configured identify a bandwidth report, if present, from a schedule application program interface (API) as an available service.

From a DOCSIS viewpoint, all endpoints are granted access to a best effort (BE) service flow without prejudice. Policy enabled services can be assigned to separate service flows. The service flows can offer classic attributes such as lower latency, for gaming and similar types of flows, bulk, low priority, low cost, high latency, for bandwidth hogs like upstream video, classifiers/admission control to a service flow, quality of service in the form of traffic prioritization, service level agreement enforcement, etc. The policies can be extended to what services are available to a client. For example, there may be a policy that a camera can connect to a personal video recorder. One or more policies could be used to setup service chains. Service chaining is a technique where packet header information is used to serially connect a series of applications together. In an example, the policy server can be discovered using a server address. For example, a generic domain name system (DNS) inquiry (e.g., to www.policyserver.com.) In another example, other ways may be used to discover the policy server (e.g., the network advertises a server, etc.).

Turning to the infrastructure of FIG. 1, communication system 100 in accordance with an example embodiment is shown. Generally, communication system 100 can be implemented in any type or topology of networks. Network 120 represents a series of points or nodes of interconnected communication paths for receiving and transmitting packets of information that propagate through communication system 100. Network 120 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 120 can include any number of hardware or software elements coupled to (and in communication with) each other through a communications medium.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, CM/HG 104a-104d, CMTS 106a-106d, policy servers 108a and 108b, and subscription manager 110, are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

As used herein in this Specification, the term 'network element' is meant to encompass any of the aforementioned elements, as well as servers (physical or virtually implemented on physical hardware), machines (physical or virtually implemented on physical hardware), end-user devices, routers, switches, cable boxes, gateways, bridges, load-balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the synonymous labels operations thereof. This may be inclusive of appropriate algorithms and communication protocols that allow for determining analytics related to a network.

In one implementation, network elements implementing the policy architecture features described herein may include software to achieve (or to foster) the functions discussed herein for providing and processing when the software is executed on one or more processors to carry out the functions. This could include the implementation of instances of modules (e.g., UE policy enforcement engine 112, CM/HG policy enforcement engine 114, CMTS policy enforcement engine 116, etc.) and/or any other suitable element that would foster the activities discussed herein. Additionally, each of these elements can have an internal structure (e.g., a processor, a memory element, etc.) to facilitate some of the operations described herein. In other embodiments, these functions for policy architecture may be executed externally to these elements, or included in some other network element to achieve the intended functionality. Alternatively, network elements may include software (or reciprocating software) that can coordinate with other network elements in order to achieve determination of analytics related to a network described herein. In still other embodiments, one or several devices may include any suitable algorithms, hardware, software, components, modules, interfaces, or objects that facilitate the operations thereof.

In regards to the internal structure associated with communication system 100, UE 102a-102c, CM/HG 104a-104d, CMTS 106a-106d, policy servers 108a and 108b, and subscription manager 110 can each include memory elements for storing information to be used in the operations outlined herein. Each of UE 102a-102c, CM/HG 104a-104d, CMTS 106a-106d, policy servers 108a and 108b, and subscription manager 110 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the policy architecture functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable/machine-readable media. In some of these instances, memory elements can store data used for the operations described herein. This includes the memory elements being able to store software, logic, code, or processor instructions that are executed to carry out the activities described herein. In some of these instances, one or more memory elements can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an EEPROM or an ASIC that includes digital logic, software, code, electronic instructions, or any suitable combination thereof.

Any of these elements (e.g., the network elements, etc.) can include memory elements for storing information to be used in achieving the policy architecture functions, as outlined herein. Additionally, each of these devices may include a processor that can execute software or an algorithm to perform the functions of policy architecture for cable networks as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

In an example implementation, network elements of communication system 100 may include software modules (e.g., UE policy enforcement engine 112, CM/HG policy enforcement engine 114, CMTS policy enforcement engine 116, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, UE 102a-102c, CM/HG 104a-104d, CMTS 106a-106d, policy servers 108a and 108b, and subscription manager 110 each may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a FPGA, an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Policy servers 108a and 108b can be a network element such as a physical server or virtual server and can be associated with clients, customers, endpoints, or end users wishing to initiate a communication in communication system 100 via some network (e.g., network 120). The term 'server' is inclusive of devices used to serve the requests of clients and/or perform some computational task on behalf of clients within communication systems 100. UE 102a-102c can include user devices.

Figure 2:
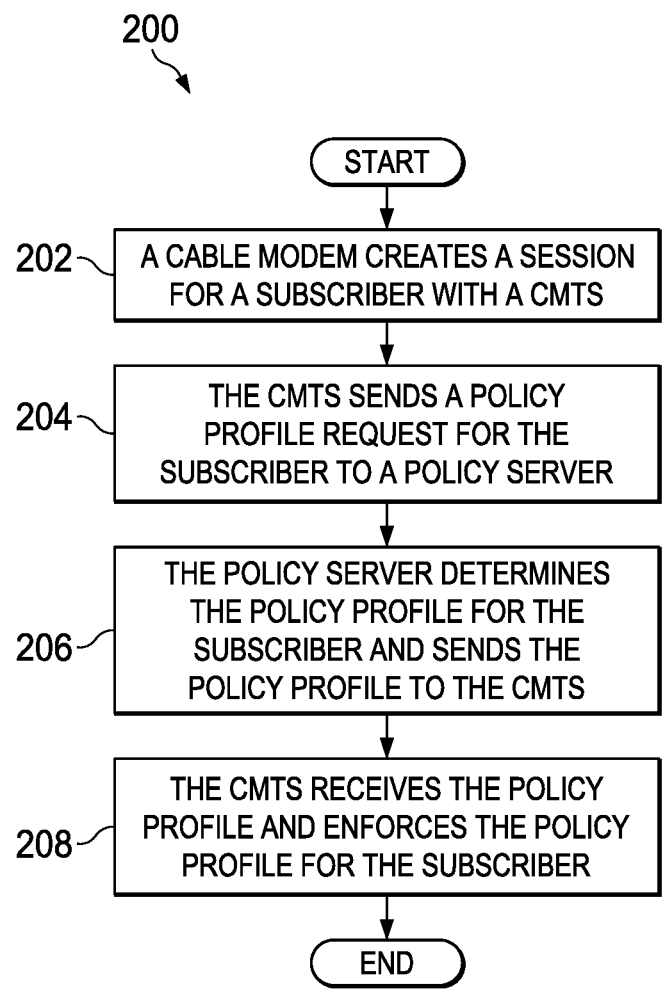
FIG. 2 is a simplified flow diagram illustrating operations associated with an embodiment of the communication system.

Turning to FIG. 2, FIG. 2 is an example flowchart illustrating possible operations of a flow 200 that may be associated with enhanced policy architecture for cable networks, in accordance with an embodiment. In an embodiment, one or more operations of flow 200 may be performed by one or more of CM/HG policy enforcement engine 114 and CMTS policy enforcement engine 116. At 202, a CM creates a session for a subscriber with a CMTS. In an example, the subscriber is a user using UE 102a to access communication system 100. At 204, the CMTS sends a policy profile request for the subscriber to a policy server. At 206, the policy server determines the policy profile for the subscriber and sends the policy profile to the CMTS. At 208, the CMTS receives the policy profile and enforces the policy profile for the subscriber.

Figure 3:
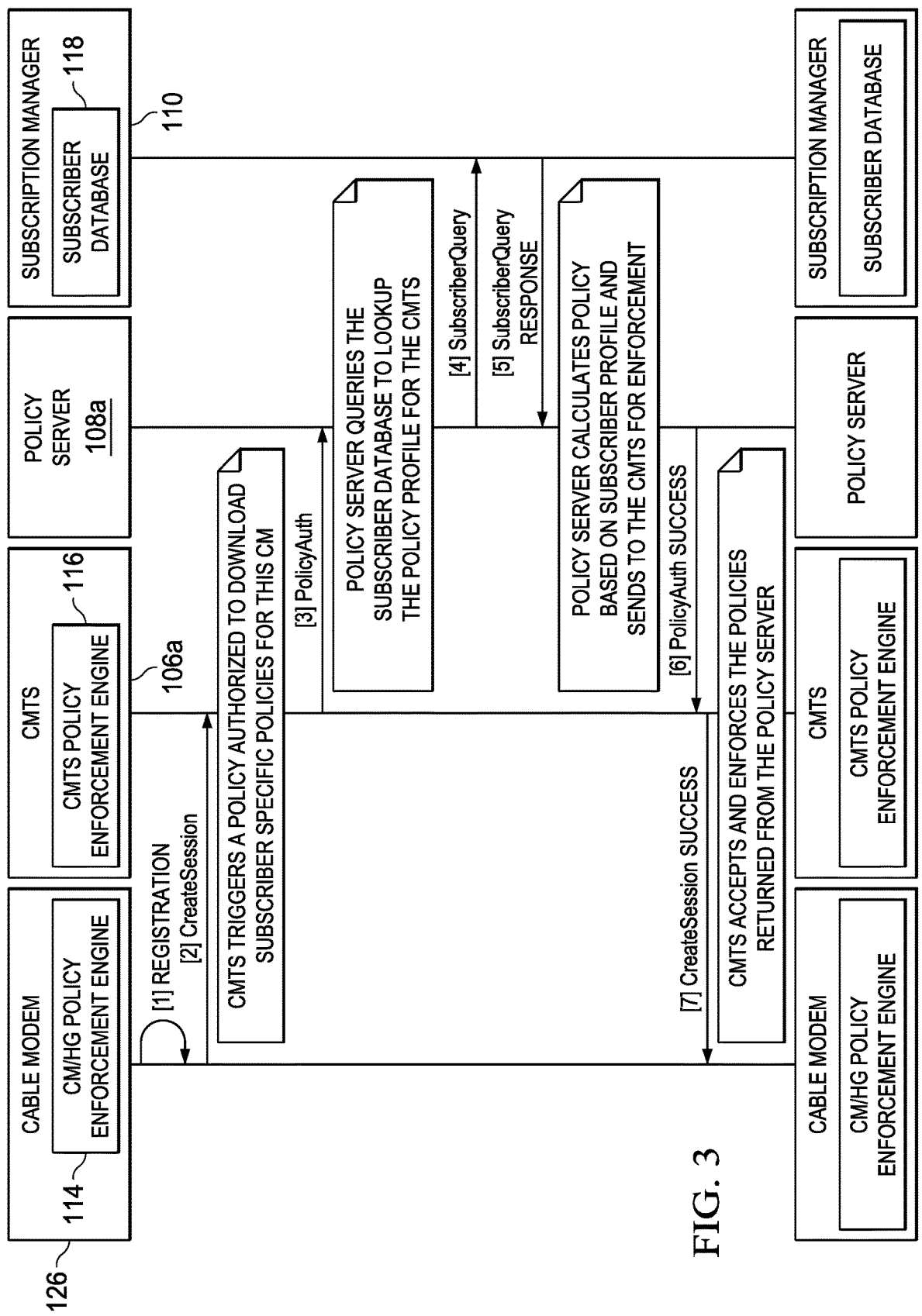
FIG. 3 is a simplified timing diagram illustrating example details associated with an embodiment of the communication system.

Turning to FIG. 3, FIG. 3 is a simplified timing diagram illustrating example details that may be associated with enhanced policy architecture for cable networks, in accordance with an embodiment. In an example, a CM 126 registers with CMTS 106a. CM 126 can be similar to CM/HG 104a. CM 126 also sends a session request to CMTS 106a. The session request triggers a policy authorization request to be sent from CMTS 106a to policy server 108a to obtain subscriber-specific policies for CM 126. In response to receipt of the policy authorization request, policy server 108a can send a subscriber query to subscriber database 118 in subscription manager 110 to look up the policy profile for CMTS 106a. Subscription manager 110 can determine a response to the subscriber query and send the response to policy server 108a. Using the response to the subscriber query, policy server 108a can calculate one or more policies based on the subscriber profile. The one or more policies are sent to CMTS 106a for enforcement by CMTS policy enforcement engine 116 and the session requested by CM 126 is created. It will be recognized that policies are applied based on dynamic context and provisioned subscriber profile information. Policy enforcement applies to ingress/egress traffic from CM 126. Policy server 108a may modify the policies on CMTS 106a over the course of the session lifecycle.

Figure 4:
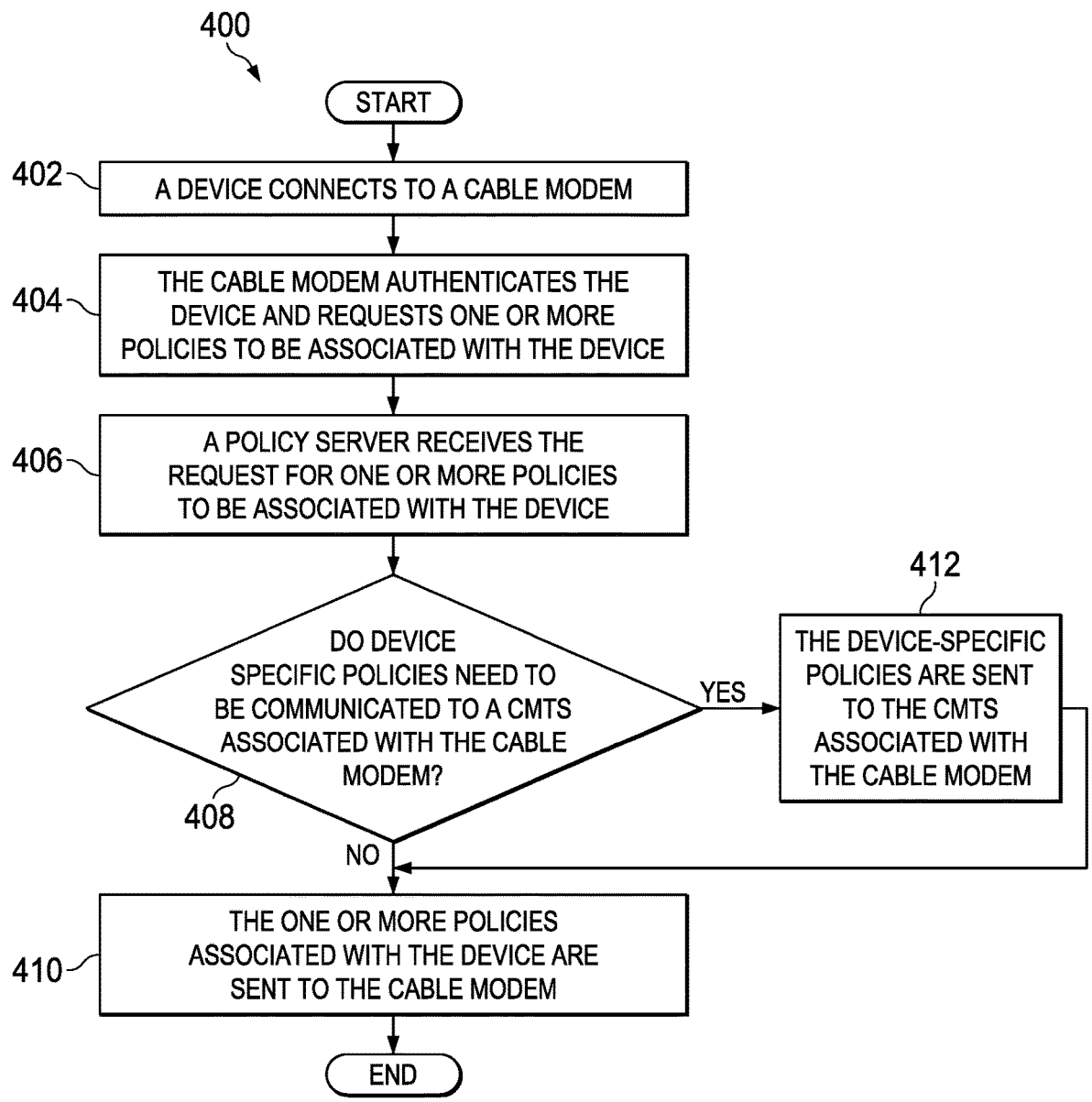
FIG. 4 is a simplified flow diagram illustrating operations associated with an embodiment of the communication system.

Turning to FIG. 4, FIG. 4 is an example flowchart illustrating possible operations of a flow 400 that may be associated with enhanced policy architecture for cable networks, in accordance with an embodiment. In an embodiment, one or more operations of flow 400 may be performed by one or more of CM/HG policy enforcement engine 114 and CMTS policy enforcement engine 116. At 402, a device connects to a cable modem. For example, UE 102a can connect to CM/HG 104a if CM/HG 104a is a cable modem. At 404, the cable modem authenticates the device and requests one or more policies to be associated with the device. At 406, a policy server receives the request for one or more policies to be associated with the device. At 408, the system determines if device specific policies need to be communicated to a CMTS associated with the cable modem. If device specific policies do not need to be communicated to a CMTS associated with the cable modem, then the device specific policies are sent to the CMTS associated with the cable modem, as in 412. At 410, the one or more policies associated with the device are sent to the cable modem. If device specific policies do not need to be communicated to a CMTS associated with the cable modem, then the one or more policies associated with the device are sent to the cable modem, as in 410.

Figure 5:
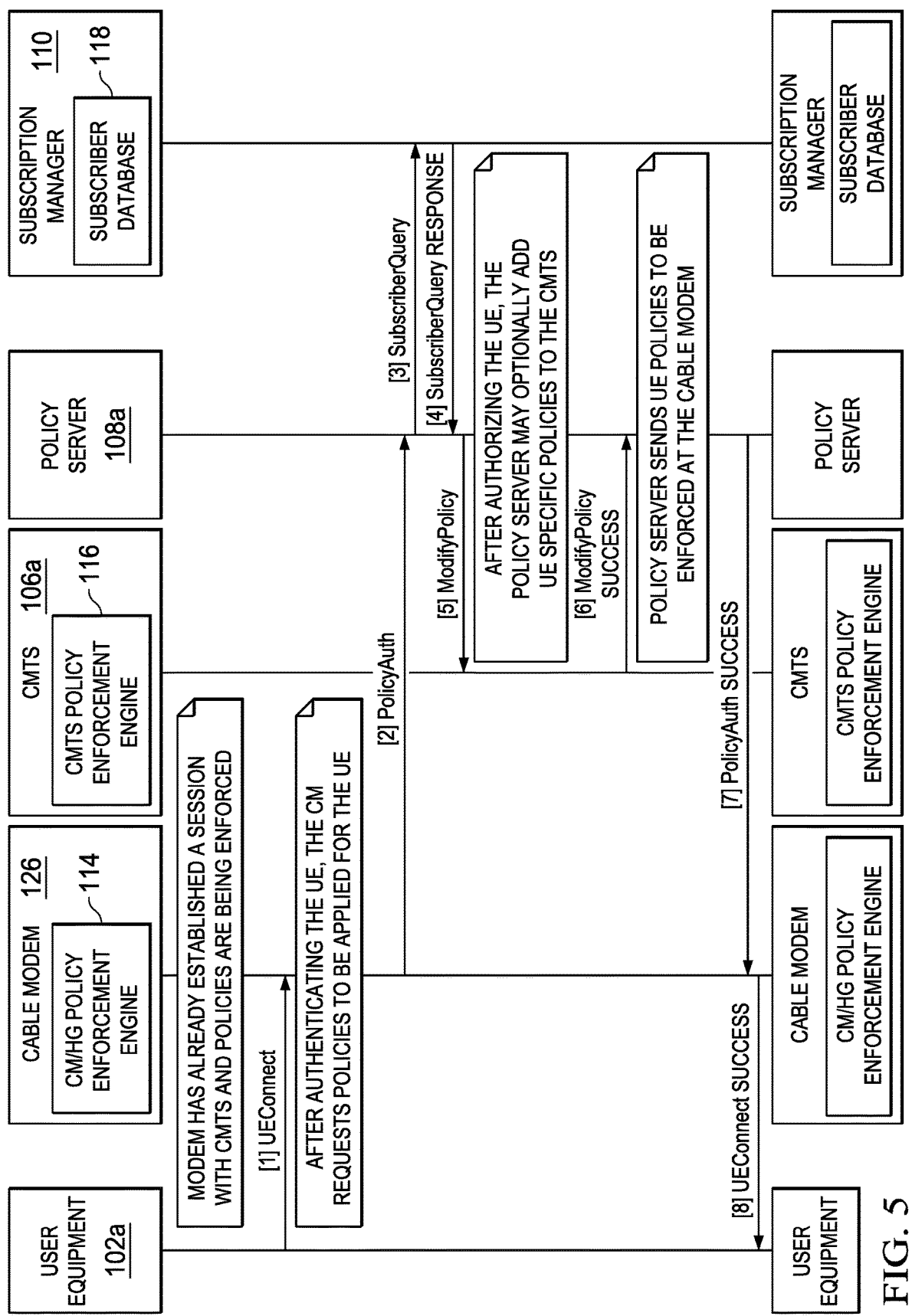
FIG. 5 is a simplified timing diagram illustrating example details associated with an embodiment of the communication system.

Turning to FIG. 5, FIG. 5 is a simplified timing diagram illustrating example details that may be associated with enhanced policy architecture for cable networks, in accordance with an embodiment. In an example, CM 126 has an established session with CMTS 106a and policies are currently being enforced by CM/HG policy enforcement engine 114. UE 102a can request a connection to be established with CM 126. After CM 126 authenticates UE 102a, CM 126 can request subscriber specific policies for UE 102a from policy server 108a. In response to the request for subscriber specific policies, policy server 108a can query subscriber database 118 in subscription manager 110 to determine a subscriber specific policy for CM 126. The subscribe specific policies can be sent from subscription manager 110 to policy server 108a. Policy server 108a can determine if one or more subscriber specific policies need to be sent to CMTS 106*a*. If one or more subscriber specific policies need to be sent to CMTS 106*a*, policy server 108*a* can send the one or more subscriber specific policies to CMTS 106*a*. CMTS 106*a* can receive the subscriber specific policies, modify relevant policies based on the received subscriber specific policies, and send a response to policy server 108*a* verifying the modification of the relevant polices. The subscriber specific policies can be enforced by CMTS policy enforcement engine 116. In addition, policy server 108*a* can send the subscriber specific policies to CM 126 to be enforced by CM/HG policy enforcement engine 114. The connection the UE 102*a* requested to be established with CM 126 can be established. Using the above process, policy server 108*a* can adjust policies enforced at CMTS 106*a* by CMTS policy enforcement engine 116 to apply subscriber specific policies per UE.

Figure 6:
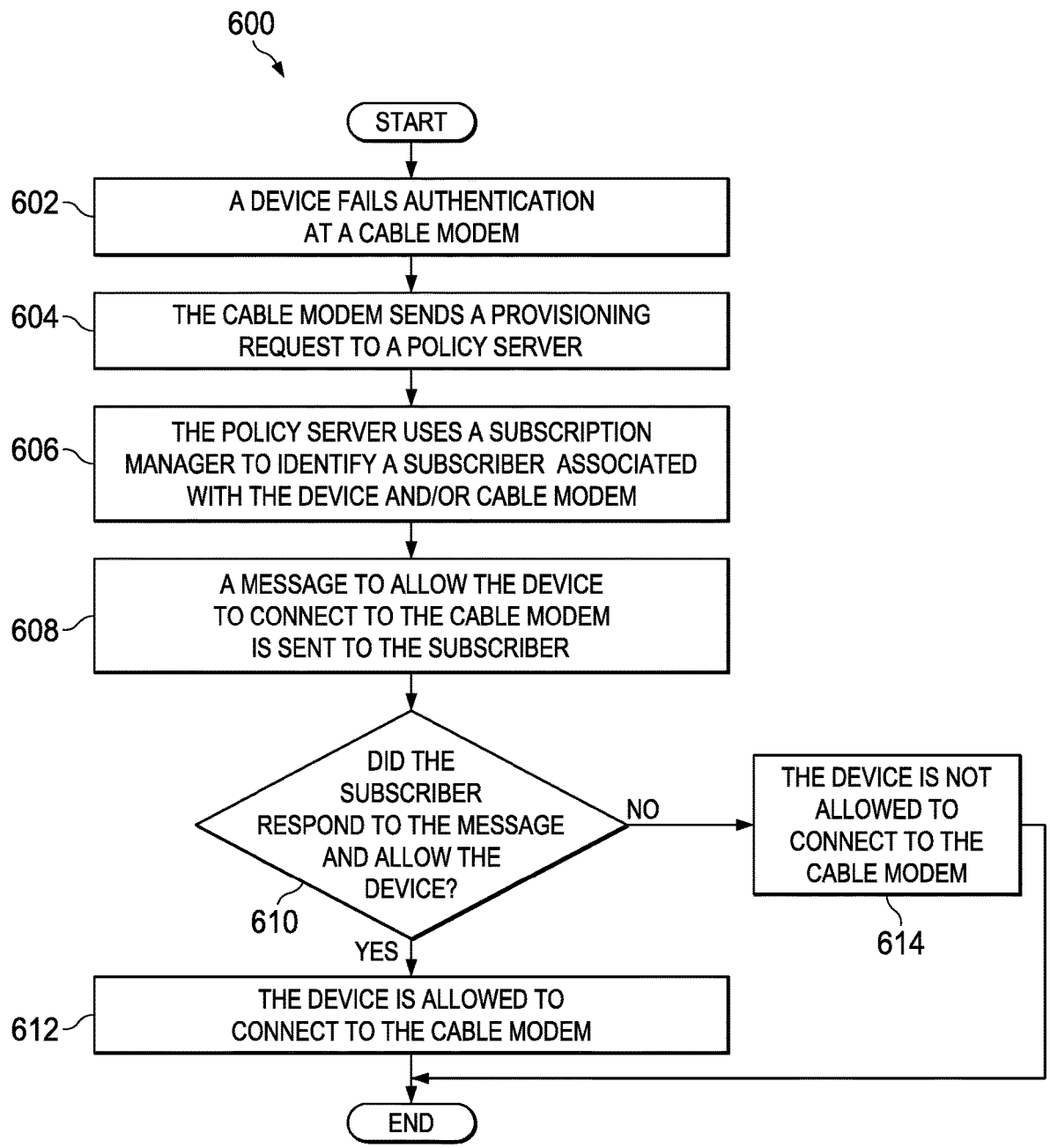
FIG. 6 is a simplified flow diagram illustrating operations associated with an embodiment of the communication system.

Turning to FIG. 6, FIG. 6 is an example flowchart illustrating possible operations of a flow 600 that may be associated with enhanced policy architecture for cable networks, in accordance with an embodiment. In an embodiment, one or more operations of flow 600 may be performed by one or more of CM/HG policy enforcement engine 114 and CMTS policy enforcement engine 116. At 602, a device fails authentication at a cable modem. At 604, the cable modem sends a provisioning request to a policy server. At 606, the policy server uses a subscription manager to identify a subscriber associated with the device and/or cable modem. At 608, a message to allow the device to connect to the CM is sent to the subscriber. For example, the message can be a text message sent to a mobile device or desktop computer associated with the subscriber. At 610, the system determines if the subscriber responded to the message and allowed the device to connect to the CM. If the subscriber responded to the message and allowed the device to connect to the CM, then the device is allowed to connect to the CM, as in 612. If the subscriber did not respond to the message or the subscriber did respond to the message but did not allow the device to be connected to the CM, then the device is not allowed to connect to the CM, as in 614.

Figure 7A:
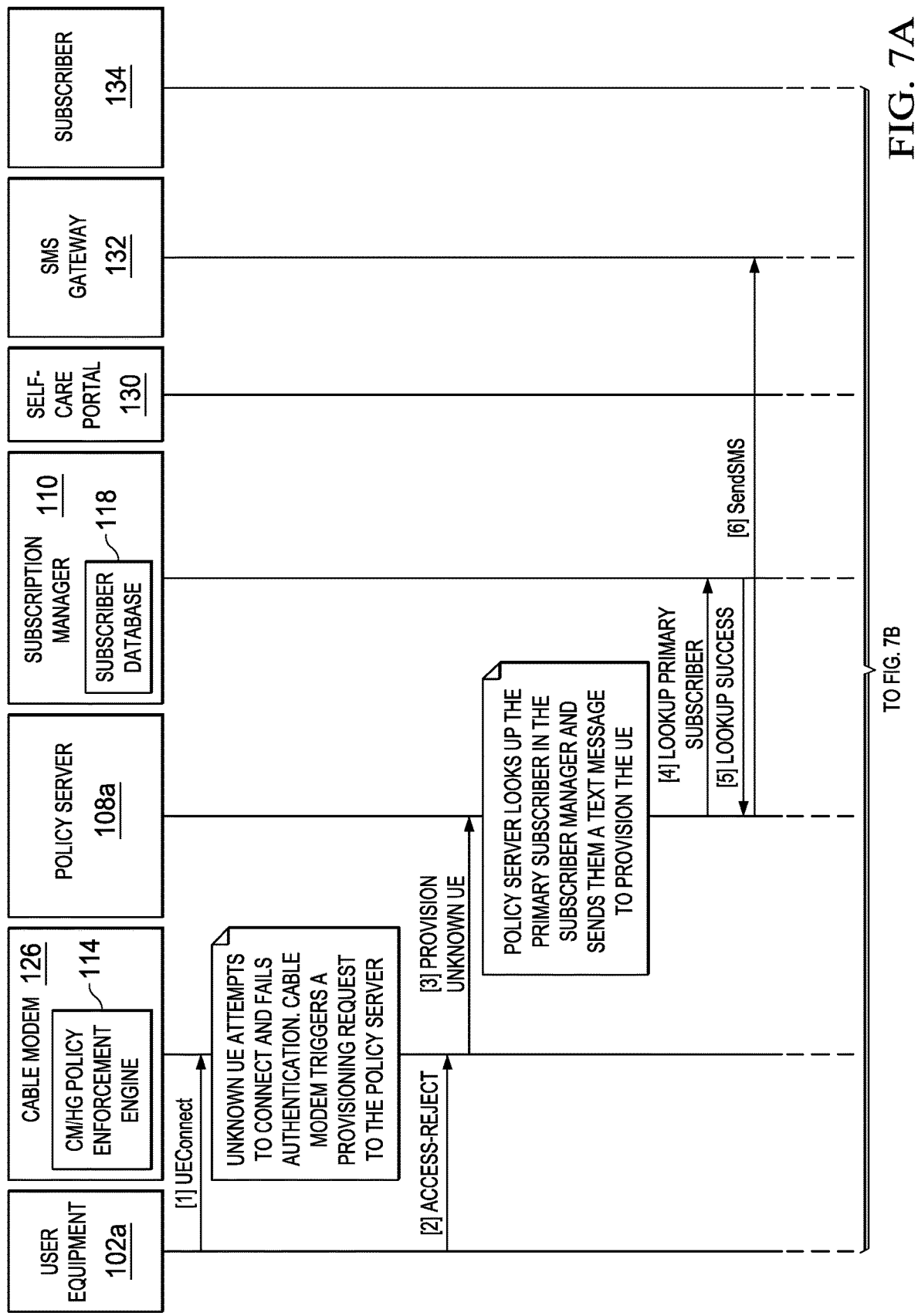
FIGS. 7A and 7B are a simplified timing diagram illustrating example details associated with an embodiment of the communication system.
Figure 7B:
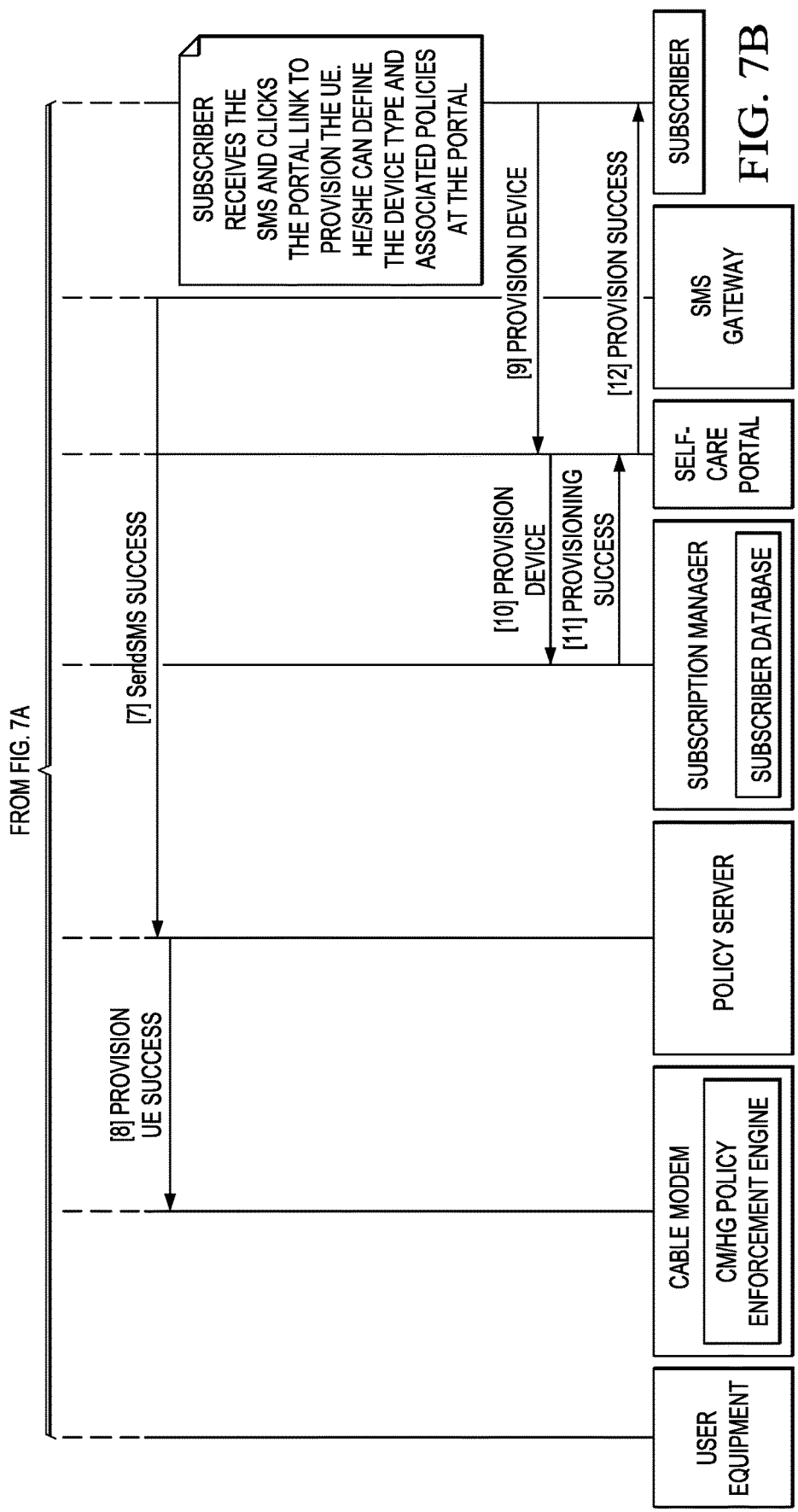

Turning to FIGS. 7A and 7B, FIGS. 7A and 7B are a simplified timing diagram illustrating example details that may be associated with enhanced policy architecture for cable networks, in accordance with an embodiment. In an example, UE 102*a* attempts to connect to CM 126. In this example, CM 126 may not recognize UE 102*a* and/or the authentication of UE 102*a* may fail. In response to not recognizing UE 102*a* and/or the authentication failing, CM 126 can send a provisioning request to policy server 108*a*. In an example, the provisioning request can be a request for policy server 108*a* to initiate a self-provision process. Policy server 108*a* can determine a primary subscriber (e.g., primary subscriber 134) associated with UE 102*a* and/or CM 126 and look up the primary subscriber in subscriber database 118. Once primary subscriber 134 is identified, policy server 108*a* can send a request to UE 102*a*, another UE associated with CM 126, and/or a device associated with primary subscriber 134 to to assign a policy for UE 102*a* and allow UE 102*a* to connect to CM 126. In an example, policy server 108*a* can send a text message or a short message service/multimedia messaging service (SMS/MMS) message using SMS gateway 132 to primary subscriber 134 to assign a policy for UE 102*a* and allow UE 102*a* to connect to CM 126. Primary subscriber 134 can use the text message or SMS/MMS message to access self-care portal 130 and to assign a policy for UE 102*a*, define the device type, etc. and allow UE 102*a* to connect to CM 126. The policy assigned by primary subscriber 134 for UE 102*a* can be communicated to subscription manger 110 and stored in subscriber database 118. Then UE 102*a* can be allowed to connect with CM 126 and the policies can be applied or the next time UE 102*a* attempts to connect to 126, the policies are applied.

In some examples, the identity of a subscriber associated with a policy may be expressed as a complex key that includes several elements, for example the name of the user or subscriber (e.g., "James"), an application (e.g., "email"), a device (e.g., "laptop"), etc. The complex key can be used to track identity and correlate access policy across technologies. Embodiments described herein enable a combination of different service provider platforms (e.g., cable, mobile, and wireless) and enable tracking a subscriber (e.g., identified by a complex key) throughout the entire network, applying a common policy across all media.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, communication system 100 may be applicable to other protocols and arrangements. In addition, although communication system 100 has been illustrated with reference to particular elements and operations that facilitate the communication process, these elements and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
extending a policy server to provide per subscriber policies to a cable modem (CM) and a cable modem termination system (CMTS);
receiving, at the policy server, a request for a policy profile from the CMTS, wherein the CMTS assigns a flow identifier to a service flow between the CM and the CMTS, the service flow identifier identifying a subscriber associated with the service flow;
accessing a subscriber database to determine the policy profile for the service flow for the subscriber;
determining that the policy profile for the service flow for the subscriber needs to be communicated to the CMTS; and
communicating, in response to determining that the policy profile for the service flow for the subscriber needs to be communicated to the CMTS, the policy profile to the CMTS, the policy profile comprising a CM policy profile enforced by the CM and a CMTS policy profile to be enforced by the CMTS, wherein the CMTS modifies policies enforced at the CMTS based on the CMTS policy profile for the service flow for the subscriber, wherein the CMTS verifies modification to the policies enforced at the CMTS based on the CMTS policy profile for the service flow for the subscriber with the policy server, wherein the CMTS enforces, upon verifying, the policies enforced at the CMTS based on the CMTS policy profile for the service flow for the subscriber, wherein the CM policy profile is sent to the CM by the CMTS as a data over cable service interface specification message, and wherein the CM enforces one or more policies from the CM policy profile to an ingress traffic and an egress traffic associated with the service flow behind the CM.

2. The method of claim 1, wherein the policy server is a packet cable multimedia policy server of a cable network.

3. The method of claim 1 further comprising:
applying at least one policy from the policy profile to the CM on registration with the CMTS, wherein policies are applied based on dynamic context and provisioned subscriber profile information.

4. The method of claim 1 further comprising:
the policy server modifying policies applied to the CMTS over a lifecycle of a session between the CM and the CMTS.

5. The method of claim 1 further comprising:
applying a UE specific policy to be enforced at the CM.

6. The method of claim 1 further comprising:
the policy server modifying the policies enforced at the CMTS to apply per UE policies.

7. The method of claim 1 further comprising, in response to an attempt by an unknown UE to connect to the CM:
the CM triggering a request to the policy server to initiate a self-provision process;
the policy server sending an SMS/MMS message to a primary subscriber to assign a policy for the unknown UE;
the primary subscriber assigning a policy to the unknown UE, wherein the policy is stored in the subscriber database; and
applying the policy assigned by the primary subscriber.

8. At least one machine-readable medium in a policy server, the at least one machine-readable medium comprising instructions that when executed by at least one processor, cause the at least one processor to:
extend the policy server to provide per subscriber policies to a cable modem (CM) and a cable modem termination system (CMTS);
receive a request for a policy profile from the CMTS, wherein the CMTS assigns a flow identifier to a service flow between the CM and the CMTS, the service flow identifier identifying a subscriber associated with the service flow;
access a subscriber database to determine the policy profile for the service flow for the subscriber; and
determine that the policy profile for the service flow for the subscriber needs to be communicated to the CMTS; and
communicate, in response to determining that the policy profile for the service flow for the subscriber needs to be communicated to the CMTS, the policy profile to the CMTS, the policy profile comprising a CM policy profile enforced by the CM and a CMTS policy profile to be enforced by the CMTS, wherein the CMTS modifies policies enforced at the CMTS based on the CMTS policy profile for the service flow for the subscriber, wherein the CMTS verifies modification to the policies enforced at the CMTS based on the CMTS policy profile for the service flow for the subscriber with the policy server, wherein the CMTS enforces, upon verifying, the policies enforced at the CMTS based on the CMTS policy profile for the service flow for the subscriber, wherein the CM policy profile is sent to the CM by the CMTS as a data over cable service interface specification message, and wherein the CM enforces one or more policies from the CM policy profile to an ingress traffic and an egress traffic associated with the service flow behind the CM.

9. The at least one machine-readable medium of claim 8, wherein the policy server is a packet cable multimedia policy server of a cable network.

10. The at least one machine-readable medium of claim 8, further comprising one or more instructions that when executed by the at least one processor, cause the at least one processor to:
apply at least one policy from the policy profile to the CM on registration with the CMTS, wherein policies are applied based on dynamic context and provisioned subscriber profile information.

11. The at least one machine-readable medium of claim 8, further comprising one or more instructions that when executed by the at least one processor, cause the at least one processor to:
modify policies applied to the CMTS over a lifecycle of a session between the CM and the CMTS.

12. The at least one machine-readable medium of claim 8, further comprising one or more instructions that when executed by the at least one processor, cause the at least one processor to:
apply UE specific policy to be enforced at the CM.

13. The at least one machine-readable medium of claim 8, further comprising one or more instructions that when executed by the at least one processor, cause the at least one processor to:
    modify policies enforced at the CMTS to apply per UE policies.

14. A policy server, comprising:
    a memory element configured to store data,
    a processor operable to execute instructions associated with the data to:
        extend the policy server to provide per subscriber policies to a cable modem (CM) and a cable modem termination system (CMTS);
        receive, at the policy server, a request for a policy profile from the CMTS, wherein the CMTS assigns a flow identifier to a service flow between the CM and the CMTS, the service flow identifier identifying a subscriber associated with the service flow;
        access a subscriber database to determine the policy profile for the service flow for the subscriber; and
        determine that the policy profile for the service flow for the subscriber needs to be communicated to the CMTS; and
        communicate, in response to determining that the policy profile for the service flow for the subscriber needs to be communicated to the CMTS, the policy profile to the CMTS, the policy profile comprising a CM policy profile enforced by the CM and a CMTS policy profile to be enforced by the CMTS, wherein the CMTS modifies policies enforced at the CMTS based on the CMTS policy profile for the service flow for the subscriber, wherein the CMTS verifies modification to the policies enforced at the CMTS based on the CMTS policy profile for the service flow for the subscriber with the policy server, wherein the CMTS enforces, upon verifying, the policies enforced at the CMTS based on the CMTS policy profile for the service flow for the subscriber, wherein the CM policy profile is sent to the CM by the CMTS as a data over cable service interface specification message, and wherein the CM enforces one or more policies from the CM policy profile to an ingress traffic and an egress traffic associated with the service flow behind the CM.

15. The policy server of claim 14, wherein the policy server is a packet cable multimedia policy server of a cable network.

16. The policy server of claim 14, wherein the processor is further operable to execute instructions associated with the data to:
    apply at least one policy from the policy profile to the CM on registration with the CMTS, wherein policies are applied based on dynamic context and provisioned subscriber profile information.

17. The policy server of claim 14, wherein the processor is further operable to execute instructions associated with the data to:
    modify policies applied to the CMTS over a lifecycle of a session between the CM and the CMTS.

18. The policy server of claim 14, wherein the processor is further operable to execute instructions associated with the data to:
    apply UE specific policy to be enforced at the CM.

19. The policy server of claim 14, wherein the processor is further operable to execute instructions associated with the data to:
    modify policies enforced at the CMTS to apply per UE policies.

* * * * *